United States Patent
Wilt

(10) Patent No.: US 7,809,904 B1
(45) Date of Patent: Oct. 5, 2010

(54) PAGE PRELOADING USING PAGE CHARACTERIZATION DATA

(75) Inventor: Nicholas P. Wilt, Rochester, NY (US)

(73) Assignee: NVIDIA Corporation, Santa Clara, CA (US)

( * ) Notice: Subject to any disclaimer, the term of this patent is extended or adjusted under 35 U.S.C. 154(b) by 739 days.

(21) Appl. No.: 11/611,780

(22) Filed: Dec. 15, 2006

Related U.S. Application Data

(63) Continuation-in-part of application No. 11/312,151, filed on Dec. 19, 2005, now Pat. No. 7,519,781.

(51) Int. Cl.
*G06T 1/60* (2006.01)
*G06F 13/00* (2006.01)

(52) U.S. Cl. .................. 711/159; 345/531; 345/536; 345/537; 345/538; 345/539; 345/547

(58) Field of Classification Search .................. 711/159
See application file for complete search history.

(56) References Cited

U.S. PATENT DOCUMENTS

| | | | |
|---|---|---|---|
| 5,708,845 A * | 1/1998 | Wistendahl et al. | 715/202 |
| 5,801,717 A | 9/1998 | Engstrom et al. | |
| 5,940,090 A * | 8/1999 | Wilde | 345/557 |
| 5,990,914 A | 11/1999 | Horan et al. | |
| 6,330,654 B1 | 12/2001 | LaBerge et al. | |
| 6,331,854 B1 * | 12/2001 | Rogers et al. | 345/473 |
| 6,366,289 B1 * | 4/2002 | Johns | 345/543 |
| 6,434,685 B1 | 8/2002 | Sexton et al. | |
| 6,526,497 B1 | 2/2003 | LaBerge et al. | |
| 6,831,652 B1 * | 12/2004 | Orr | 345/543 |
| 7,447,997 B2 | 11/2008 | Colle | |
| 7,519,781 B1 | 4/2009 | Wilt | |
| 2002/0093507 A1 | 7/2002 | Olarig | |
| 2006/0092165 A1 | 5/2006 | Abdalla et al. | |

* cited by examiner

*Primary Examiner*—Hetul Patel
(74) *Attorney, Agent, or Firm*—Townsend and Townsend and Crew LLP; J. Matthew Zigmant

(57) ABSTRACT

Circuits, methods, and apparatus that pre-load data that may be needed by a graphics processor to render upcoming scenes. One example determines one or more possible upcoming scenes or views. To save computing resources, the possible upcoming scenes are not fully rendered, but the addresses, and corresponding pages, of data that would be needed to render the scenes are determined. Page usage information is also gathered. Pages that would be needed to render the upcoming scenes, but which are not resident in memory, are read in from a disk drive and stored in memory before they are needed. Pages that are infrequently used are removed from physical memory. In this way, when the scene changes, a large number of page faults do not occur in one frame, rather, they are distributed among several frames.

20 Claims, 16 Drawing Sheets

PAGE PRELOADING USING PAGE CHARACTERIZATION DATA

CROSS-REFERENCES TO RELATED APPLICATIONS

The application is a continuation-in-part of U.S. patent application Ser. No. 11/312,151, titled "Physically-Based Page Characterization Data," filed Dec. 19, 2005, by Wilt, now U.S. Pat. No. 7,519,781, which is hereby incorporated by reference.

BACKGROUND

The present invention relates generally to memory management and more particularly to pre-loading graphics data before it is needed by a graphics processor to render to scene.

The amount of data needed by applications running in a computer system has greatly increased the past few years, and the rate of this increase shows no signs of abating. To handle this data, computer systems need to incorporate improved ways to manage data in memory.

Data stored in memory is often arranged in pages. These pages are stored at physical addresses in one or more memory devices, for example one or more DRAMs and hard disk drives. A DRAM can only store a limited amount of data, but is able to quickly provide it for use by an application. A hard disk drive stores a great deal of data, but is slower to provide it.

Since these DRAMs or memories can store only a limited amount of data, when new data that is not in the memories is needed, it is copied or swapped in from a hard disk drive and stored in memory. The original data remains on the disk to prevent it from being lost is power is removed from the memories. Data stored in the memory is also written back to the disk if it has been modified; if it has not been modified the data in memory can be overwritten.

"Demand-based" systems determine that the system needs missing data when it attempts to access the data and determines that the needed data is not present. This process works well as long as limited amounts of data are needed from disk each frame. That is, when scenes being rendered change only incrementally, a manageable amount of new pages need to swapped in from memory each frame.

However, when a scene being rendered changes considerably from one frame to the next, many new pages of data may need to swapped in during one frame. This may severely degrade graphics performance and lead to a stalling or hesitation in the images being displayed.

Accordingly, what is needed are circuits, methods, and apparatus that prevent this stalling or hesitation when a scene that is being rendered changes considerably from one frame to the next.

SUMMARY

Accordingly, embodiments of the present invention provide circuits, methods, and apparatus that pre-load data that may be needed by a graphics processor to render upcoming scenes. An exemplary embodiment of the present invention determines one or more possible upcoming scenes or views. To save computing resources, the possible upcoming scenes are not fully rendered, but the addresses, and corresponding pages of data that would be needed to render the scenes are determined. Page usage information is also gathered. Pages that are needed to render the possible upcoming scenes, but which are not resident in memory, are read in from a disk drive and stored in memory before they are needed. Pages that are infrequently used are removed from physical memory and, if they have been modified, written back to the disk. In this way, when the scene changes considerably, a large number of page faults do not occur in one frame, rather, they are distributed among several frames. A further embodiment of the present invention determines visibility in the potentially upcoming scenes and does not pre-load pages that do not contain data that would be visible if the scene is later rendered.

Another embodiment of the present invention tracks actual page usage data with a first bit vector or set of bit vectors, and potential or upcoming page usage with a second bit vector or set of vectors. The actual usage data can be kept for only pages that are resident in physical memory. This usage data may be a vector where a bit is flipped for each page that is accessed during a certain period of time. The usage data may be tracked using two vectors where data is written to a first vector while data is read from a second vector. The usage data may be alternately tracked using multiple vectors whose values are accumulated to form a histogram that gives more detailed usage information. These various techniques, and others, may be combined to track actual usage.

Upcoming usage data can be kept for pages that are not resident in memory but are stored on the disk. This can be tracked using a vector, where a bit in the vector is flipped each time a page is determined to be needed if an upcoming scene is rendered. As with the current use vector, this usage data may be tracked using two vectors where data is written to a first vector while data is read from a second vector. The usage data may be alternately tracked using multiple vectors whose values are accumulated to form a histogram that gives more detailed usage information. These various techniques, and others, may be combined to track potential upcoming usage. In an embodiment where upcoming usage is tracked for pages on the disk, the current usage bit vector should be updated with upcoming usage information such that resident pages that are not currently being used, but will be needed if an upcoming scene is rendered, are not swapped out to disk.

Alternately, upcoming usage data can be kept for all pages, whether they are resident in memory or stored on the disk. Upcoming usage can be tracked using a vector, where a bit in the vector is flipped each time a page is determined to be needed if an upcoming scene is rendered. Again, this usage data may be tracked using two vectors where data is written to a first vector while data is read from a second vector. The usage data may be alternately tracked using multiple vectors whose values are accumulated to form a histogram that gives more detailed usage information. These various techniques, and others, may be combined to track potential upcoming usage. In an embodiment where upcoming usage is tracked for all pages regardless of location, the current usage bit vector does not need to be updated with upcoming usage information.

Various embodiments of the present invention may incorporate one or more of these and the other features described herein. A better understanding of the nature and advantages of the present invention may be gained with reference to the following detailed description and the accompanying drawings.

DESCRIPTION OF EXEMPLARY EMBODIMENTS

Figure 1:
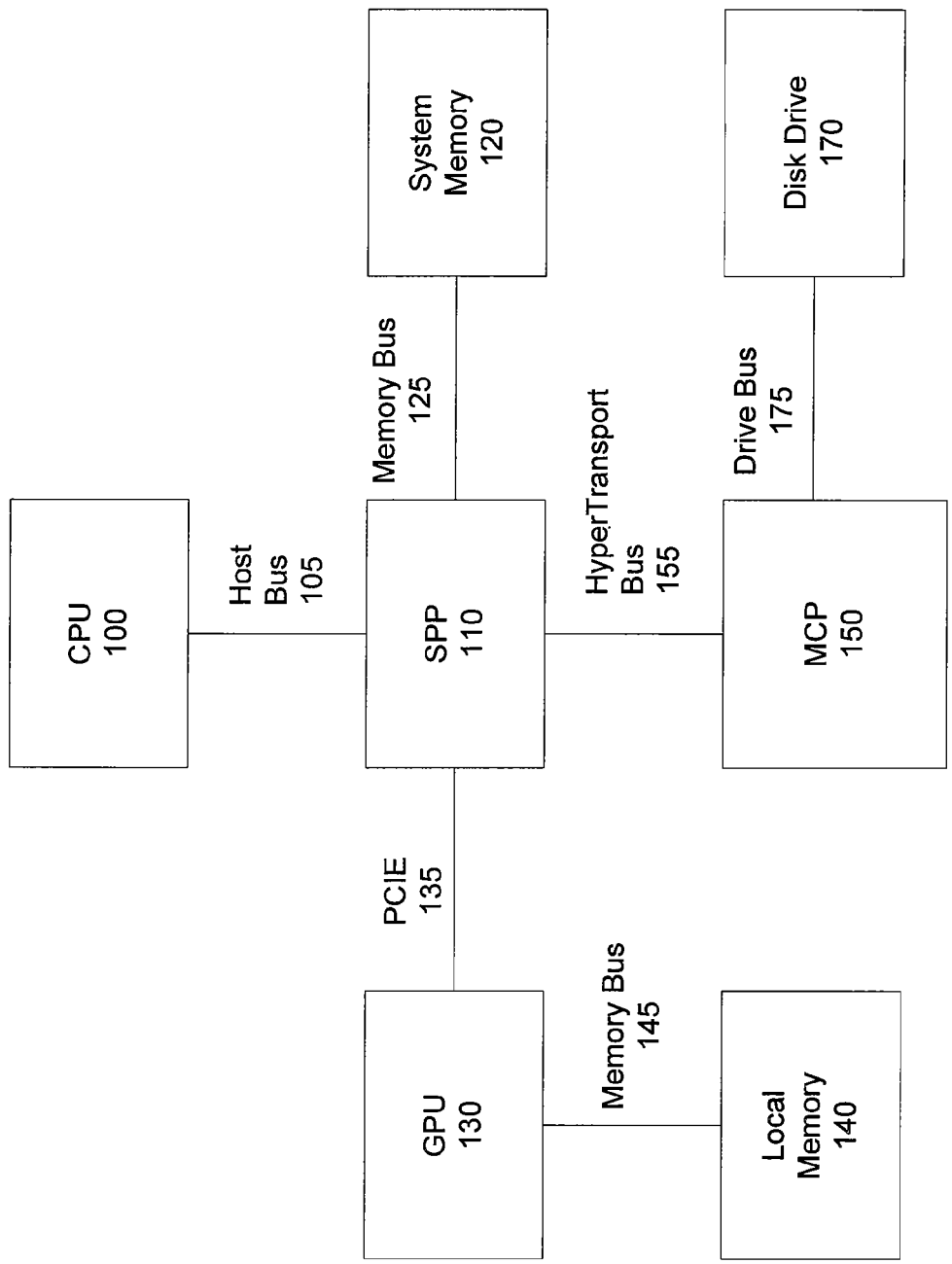
FIG. 1 is a block diagram of a computing system that is improved by incorporating an embodiment of the present invention.

FIG. 1 is a block diagram of a computing system that is improved by incorporating an embodiment of the present invention. This block diagram includes a central processing unit (CPU) or host processor 100, system platform processor (SPP) 110, system memory 120, graphics processing unit (GPU) 130, frame buffer, local, or graphics memory 140, MCP 150, and hard disk drive 170.

The CPU 100 connects to the SPP 110 over the host bus 105. The SPP 110 is in communication with the graphics processing unit 130 over an advanced graphics port (AGP) or peripheral component interconnect express (PCIE) bus 135. The SPP 110 reads and writes data to and from the system memory 120 over the memory bus 125. The MCP 150 communicates with the SPP 110 via a high-speed connection such as a HyperTransport bus 155, and connects network and internal and peripheral devices (not shown) as well as hard disk drive 170 to the remainder of the computer system. The graphics processing unit 130 receives data over the AGP or PCIE bus 135 and generates graphic and video images for display over a monitor or other display device (not shown). The graphics processing unit 130 may make use of a frame buffer or graphics memory 140—via the memory bus 145—as well as the system memory 120.

The CPU 100 may be a processor, such as those manufactured by Intel Corporation or other supplier and are well-known by those skilled in the art. The SPP 110 and MCP 150 are commonly referred to as a chipset. The memory 120 is often a number of dynamic random access memory devices arranged in a number of the dual in-line memory modules (DIMMs). The graphics processing unit 130, SPP 110, and MCP 150 are preferably manufactured by NVIDIA Corporation of Santa Clara, Calif.

Embodiments of the present invention may be used to improve the graphics processing unit 130. Also, other systems and circuits are improved by the incorporation of embodiments of the present invention. For example, the GPU 130 and SPP 110 may be combined as an integrated graphics processor or IGP. This device is similarly improved by the incorporation of embodiments of the present invention. Moreover, the CPU 100 and other types of processors, such as video, audio, or general purpose processors, and other types of processors and circuits may be improved by the incorporation of embodiments of the present invention. Also, while embodiments of the present invention are well suited to managing memory data for video and graphics applications, other types of data in audio or other applications may be similarly improved. Further, other types of circuits will be developed, or are currently being developed, and these may also be improved by the incorporation of embodiments of the present invention.

Again, applications running on the CPU 100, GPU 130, or other circuit, store data in memory, where the data is arranged in pages. These pages may be stored in the fast, easily accessible DRAM based memory such as the system memory 120 or graphics memory 140, or in the slower, less accessible disk drive 180. Again, it is desirable to store data being used by an application in the faster DRAM memory. If data is not being used, it can be swapped out to disk, while if it is needed, it can be brought in from the disk and stored in DRAM.

The data stored in these locations have physical addresses that depend on the physical location of the page. Since it is undesirable for an application to track these address changes, applications use virtual addresses, which can then be translated to physical addresses. An example showing the translation of virtual addresses to physical addresses is shown in the following figure.

Figure 2:
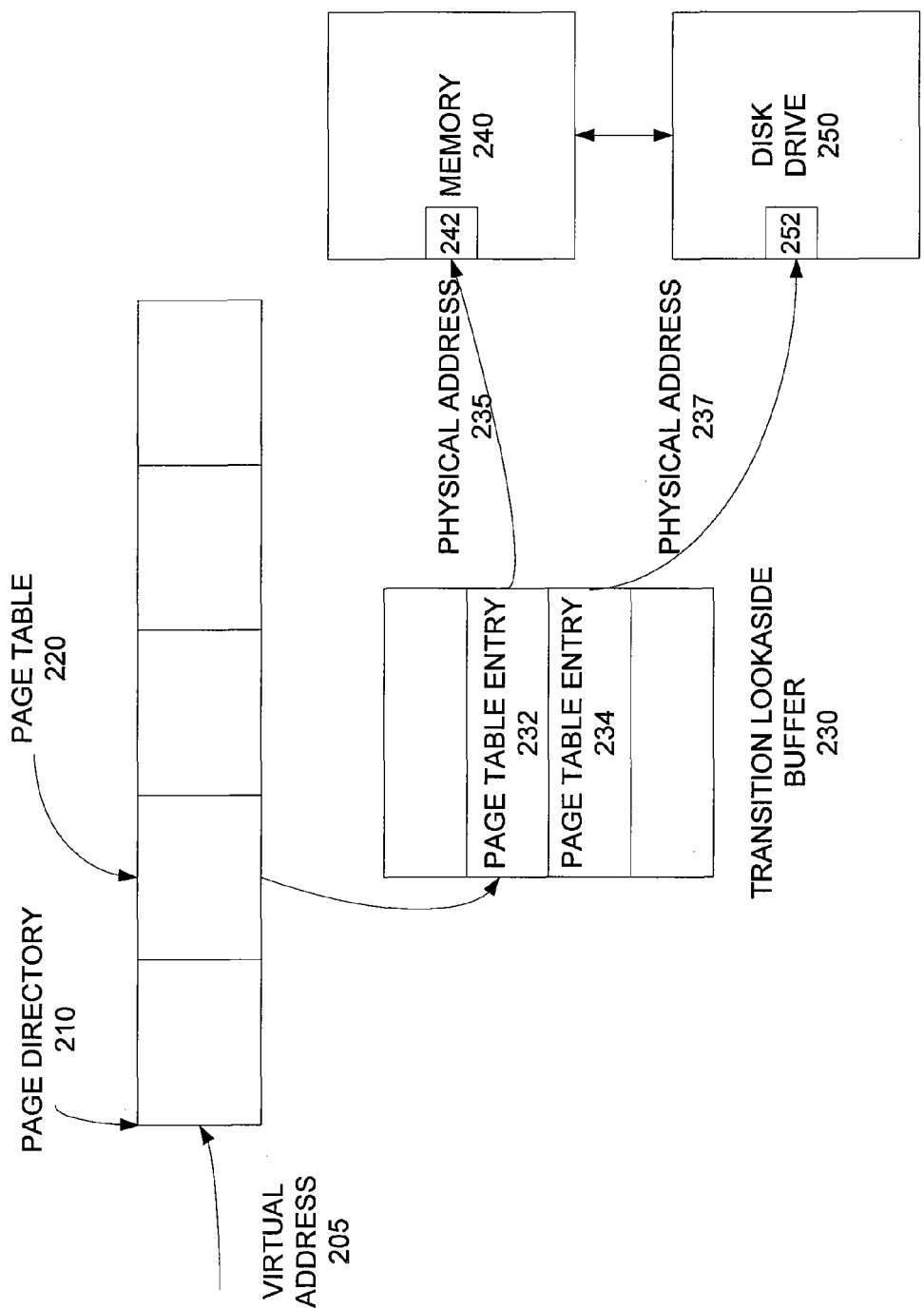
FIG. 2 is a diagram showing the translation of a virtual address to a physical address which identifies a location a memory.

FIG. 2 is a diagram showing the translation of a virtual address to a physical address which identifies a location a memory. This figure includes a page directory 210 that includes a number of page tables 220. Each page table includes a number of page table entries, each of which include a physical address in a memory, such as the address 242 in memory 240 or the address 252 in disk drive 250.

Whether a page has been used can be tracked using page usage bits. If a page is used, its page usage bit is set. Both page usage bits and physical addresses can be stored in page table entries, along with other types of data that characterize a page. Examples of other data that may be stored in a page table entry include dirty bits that indicate whether a page has been updated in cache, compression bits that indicate whether data in the page is compressed, and bits that indicate whether data in a page may be cached.

Software know as a virtual memory manager sweeps these page tables 220 to determine, among other things, which are candidates for eviction, that is, it checks page usage bits to determine which pages are not being accessed such that they can be replaced in the event of a page fault.

But it is difficult to store this information in virtual space. Also, data needs to be stored for each virtual page, whether it is physically located in DRAM or on disk. Accordingly, an embodiment of the present invention stores page usage or other characterization data post translation using physical addresses. In this way, only those pages that reside in DRAM memory are stored.

This characterization data can be stored using contiguous or noncontiguous physical addresses. The addresses may be linear, as in a vector, or as an array. The data may be stored using various banks, giving the resulting data structure a three-dimensional quality. Examples of contiguous and non-contiguous bit vectors are shown in the next figure.

Figure 3A:
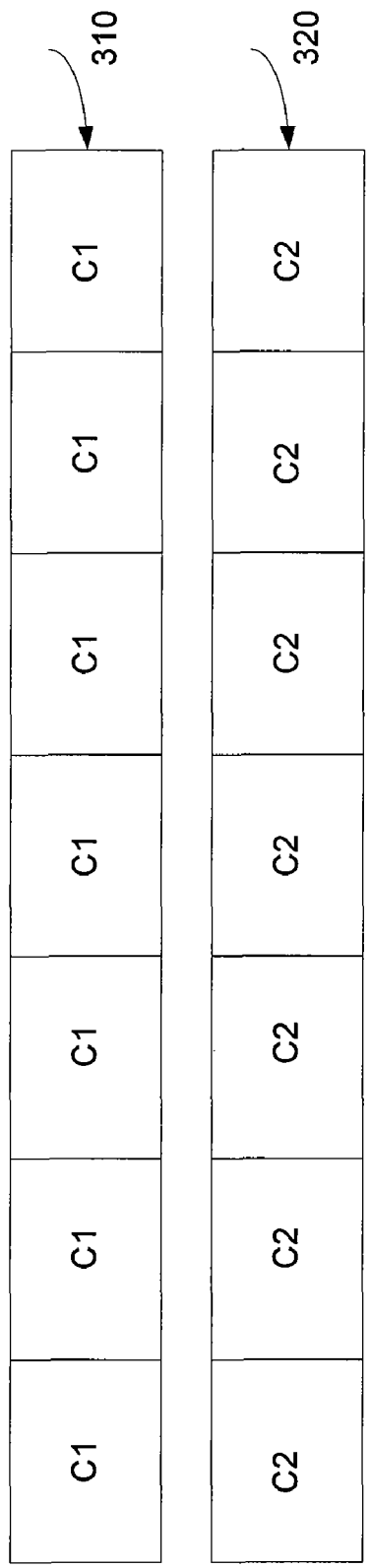
FIGS. 3A and 3B illustrate bit vectors that may be used in an embodiment of the present invention.
Figure 3B:
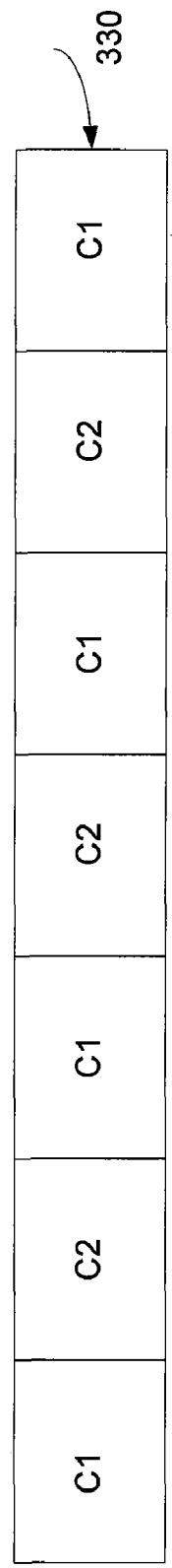

FIGS. 3A and 3B illustrate bit vectors that may be used in an embodiment of the present invention. FIG. 3A includes two vectors 310 and 320. These vectors include a number of bits corresponding to characteristics for pages in memory. In this example, the characteristics are referred to as C1 and C2. In other embodiments, each of these characteristics may refer to parts of pages, or multiple pages in memory.

Various characteristics for pages in memory may be tracked using bit vectors 310 and 320. For example, these characteristics may be page usage information, reflecting whether a page and memory has been accessed during a preceding period of time. These vectors may also store information regarding whether a page and memory has been updated in a cache, such as a cache and a central processing unit or graphics processing unit.

Other information may be stored in these bit vectors. For example, graphics information such as pixel values, texels, and the like are often compressed. A status data bit indicating whether this data is stored in a compressed format can be stored along with the data itself. This data may be referred to as an annotation, and a vector or array storing a number of these status of bits may be referred to as an annotation data structure. Still other information may be stored in these bit vectors. For example, some types of data, such as graphics data should not be stored in a cache. Accordingly, page table entries may include bits indicating whether the data is cacheable. These bits may be stored in a bit vector, such as the bit vectors 310 or 320.

In FIG. 3A, the characteristics C1 and C2 are stored in a contiguous manner in bit vectors 310 and 320. In other embodiments, the data that may be stored in a noncontiguous fashion, such as shown in the following figure.

In FIG. 3B, two characteristics are stored in an interleaved manner in bit vector 330. Still other combinations are possible, for example 3, 4, or more characteristics may be stored in a bit vector such as the bit vector 330, and these characteristics may be stored in a number of arrangements.

These bit vectors may be generated by different circuits such as the circuits in FIG. 1, and stored in various memory locations. For example, the CPU 100 may generate and store this information in the system memory 120. Also, the GPU 130 may generate and store this in the graphics memory 130, or in a video memory in the system memory 120, while the SPP 110 may also store this in the system memory 120. Data can be written from these devices to the memory using a frame buffer interface on the device itself or a frame buffer interface that is on another device.

In other embodiments, this data may be stored on-chip, since these vectors are reasonably sized. For example, given a 4 kbyte page size, 1 gigabit of memory can be tracked using $(10^9)/(8(4\times10^3))$ or 32 k bits, where $\char`^\char`^$ is a symbol meaning "to the power of."

Depending on the exact implementation, these vectors may need to be translated back to virtual space for use by a CPU. However, CPUs are sufficiently fast at this time that this task should not be unduly burdensome.

Again, only characteristics of pages residing in DRAM memory are stored. Characterization data for pages that are on disk is not needed. For example, it is not of interest whether a page on disk has been accessed; if it is not accessed, it will be brought in from disk and stored in the DRAM memory.

This means that such characterization bits, or an annotation structure, can be omitted when data is swapped out to disk and reinstated when read back from memory. The annotation structure can be reinstated by examining the annotated data (the page data in memory) itself, or by setting a default value.

For example, data may be compressed and stored in memory, where each page has a corresponding compression bit indicating whether it is compressed. When this data is swapped out to disk, the compression bits may be omitted. When the data is reinstated in DRAM memory, the compression bits may be reconstructed. This may be done by examining the data itself and making a determination of whether the data is compressed. Alternately, a default value, likely indicating non-compressed, may be used for the reinstated data.

This principle may be used for other characteristics as well. Again, page usage bits may be deleted when a page is written out to disk. Once reinstated, a default value of accessed (since it was just brought in) can be used initially.

Vectors such as bit vector 310 and 320 in FIG. 3A and bit vector 330 in FIG. 3B offer a snapshot view of a characteristic. These vectors may be compiled and stored in an array in order to give a more meaningful look at that particular characteristic.

Figure 4:
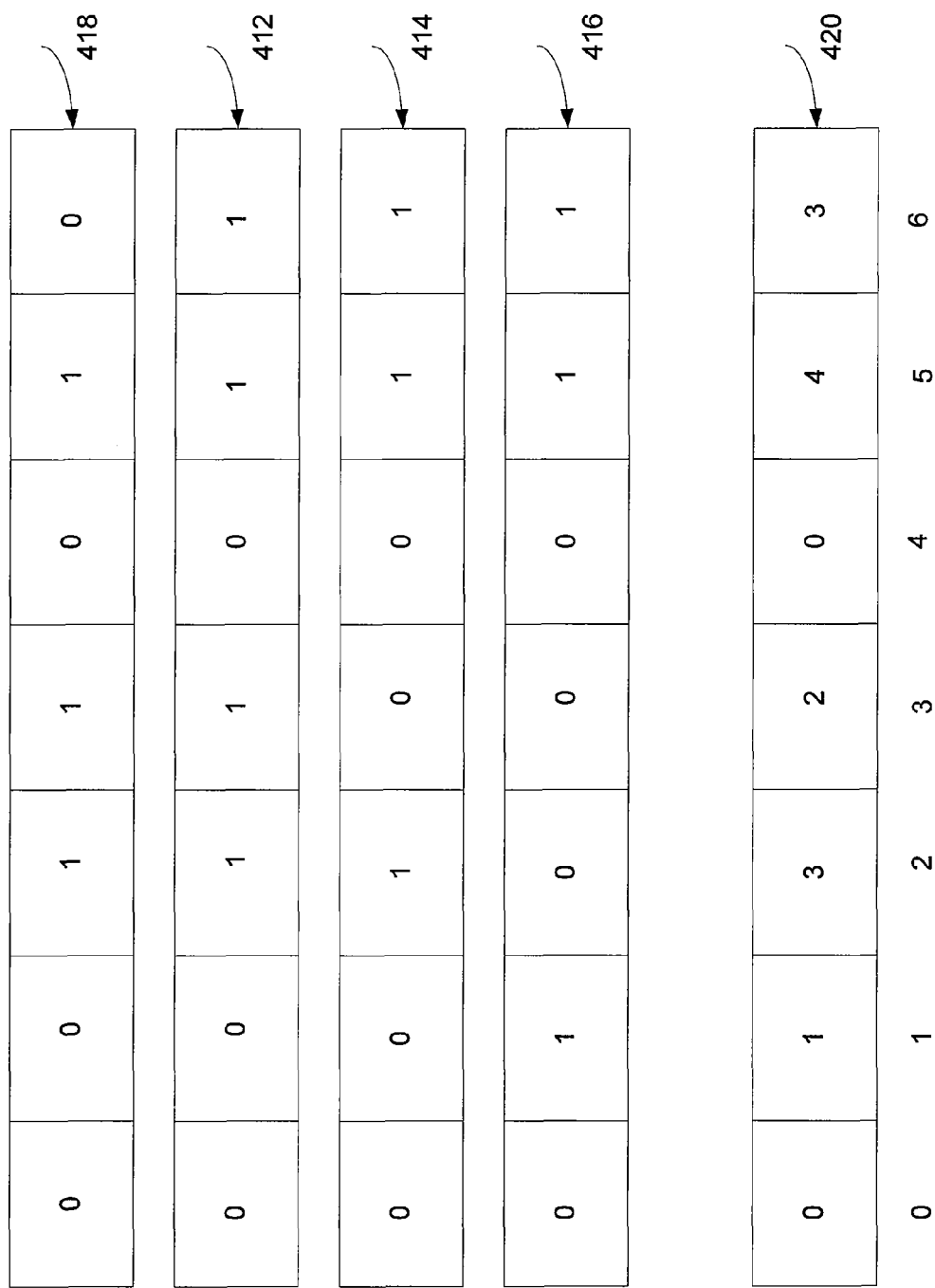
FIG. 4 illustrates an array of bit vectors used to generate histogram values according to an embodiment of the present invention.

FIG. 4 illustrates an array of bit vectors used to generate histogram values according to an embodiment of the present invention. This figure includes bit vectors 412, 414, 416, and 418, and histogram values 424. The histogram values may be for a number of page tables, here labeled 0-6. Alternately, the histogram values may each be for a part of a page table or multiple page tables.

In this specific example, individual bit vectors are stored in one of four locations. Here, bit vector 412 is written to first, followed by bit vectors 414, 416, and 418 in sequence. The vector characteristics have a value 0 or 1 and the characteristics for each page, or portion of the page or pages, are added to give histogram values 420. For example, page 0 has that characteristic values of 0 for each vector, thus its histogram value is 0. Conversely, page 5 has a characteristic value of one for each of the bit vectors, thus its histogram value is four.

In a specific embodiment of the present invention, one particular characteristic tracked by such a histogram is page usage. Accordingly, each bit vector 412, 414, 416, and 418, indicates whether a page has been used during a period of time. Again, this is useful in determining which pages may be removed in the event of the page fault.

The histogram values 420 provide even greater insight as to which pages can be moved from memory to disk. The histogram values 420 provide not just information as to whether a page has been accessed during a period of time, but during how many periods of time the page was accessed. For example, in the event of a page fault, pages 0 and 4 are better candidates for eviction than page 1; page 1 has at least been accessed. However, if the most recent bit vector, bit vector 418, was the only information available, pages any of the pages 0, 1, 4, or 6 might be evicted.

In this particular example, there are four bit vectors whose values are added to generate a histogram value. In other embodiments of the present invention, other numbers of bit vectors may be added to generate a histogram value. Also, in this example, each bit in the bit vectors is equally weighted. In other embodiments of the present invention, the weighting may be unequal. For example, a more recent bit vector entry may be more highly weighted, on the theory that a page that has been recently accessed is more likely to be accessed again than a page that was more remotely accessed.

Again, in this example, bit vector 412 was written to first, thus it is the oldest bit vector. When a new snapshot or bit vector is to be incorporated in the histogram, this oldest bit vector is typically overwritten, though variations of this are possible consistent with embodiments of the present invention. One example of how to overwrite the vector 412 is shown in the following figures.

Figure 5A:
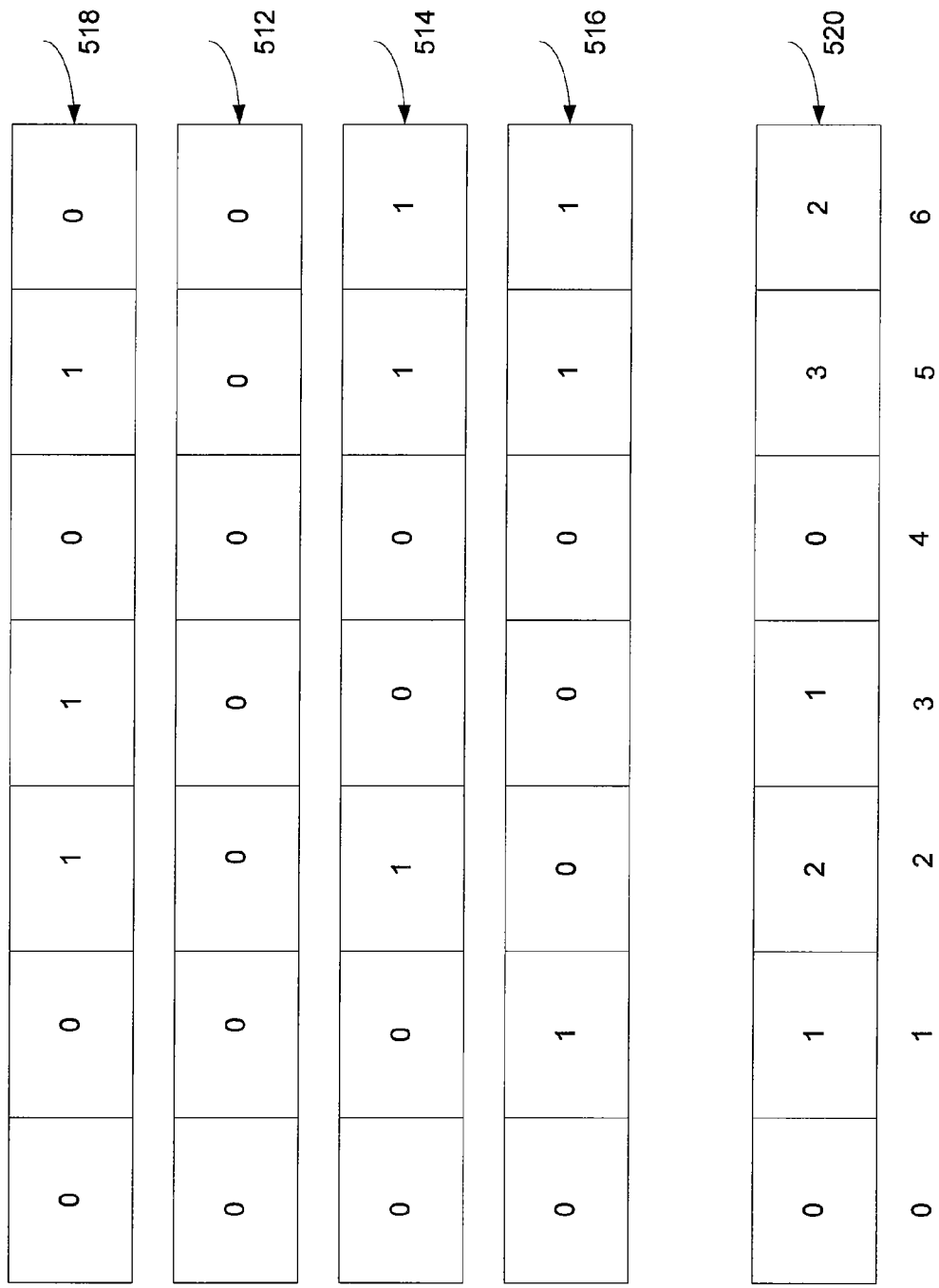
FIGS. 5A and 5B illustrate a method of overriding a bit vector and updating a histogram value according to an embodiment of the present invention.
Figure 5B:
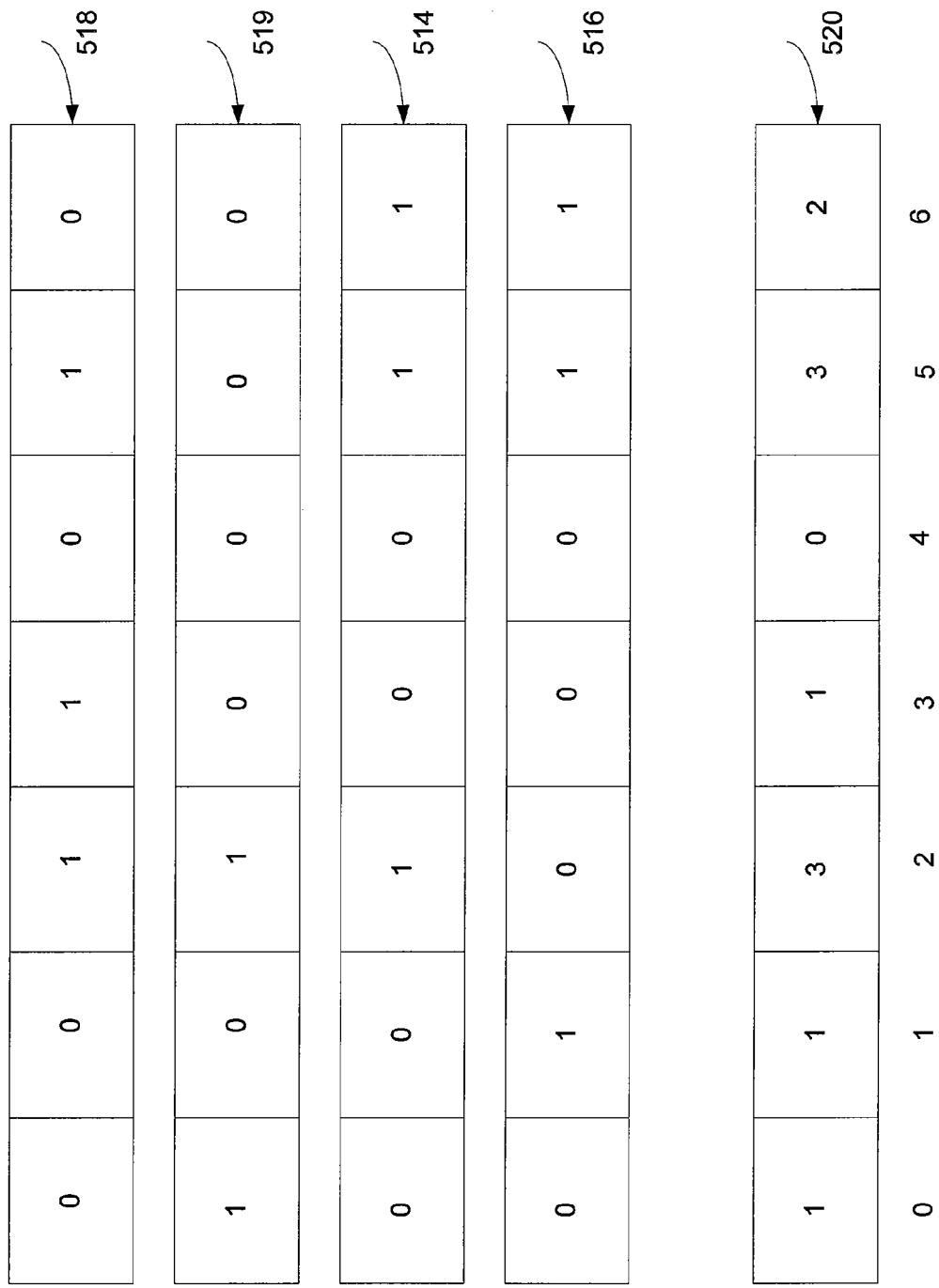

FIGS. 5A and 5B illustrate a method of overwriting a bit vector and updating histogram values according to an embodiment of the present invention. In FIG. 5A, bit vector or array line 512 is cleared such that each of its bits is reset to zero. The histogram values 520 are updated accordingly. For example, the value for page 2 in bit vector 512 is reset from a one to a zero. Accordingly, its histogram value is reduced from a 3 to a value of 2. Embodiments of the present invention may implement this in various ways. For example, the values for the bit vector or array line 512 to be cleared can be subtracted from the histogram values 520, after which the bit vector or array line 512 can be cleared. Alternately, the histogram values 520 may be implement as continuous totals of the lines in the array, such that when line 512 is cleared or reset to zero, histogram values 520 are updated automatically.

In FIG. 5B, a new bit vector 519 is written to the previously cleared location. The histogram values 520 are updated accordingly. For example, the page 0 value of bit vector or array line 519 is a 1, accordingly the histogram entry is incremented from a value of zero to a value of one.

As vector 519 is written to the bit vector array, the data being tracked continues to be produced. This makes it difficult to read data in a bit vector. Accordingly, an embodiment of the present invention writes data to two bit vectors. While data is written to one bit vector, it can be read from the other. In one embodiment of the present invention, while a histogram is being updated with data from a first bit vector, data can be written to a second bit vector. One method of doing this is shown in the following figures.

Figure 6:
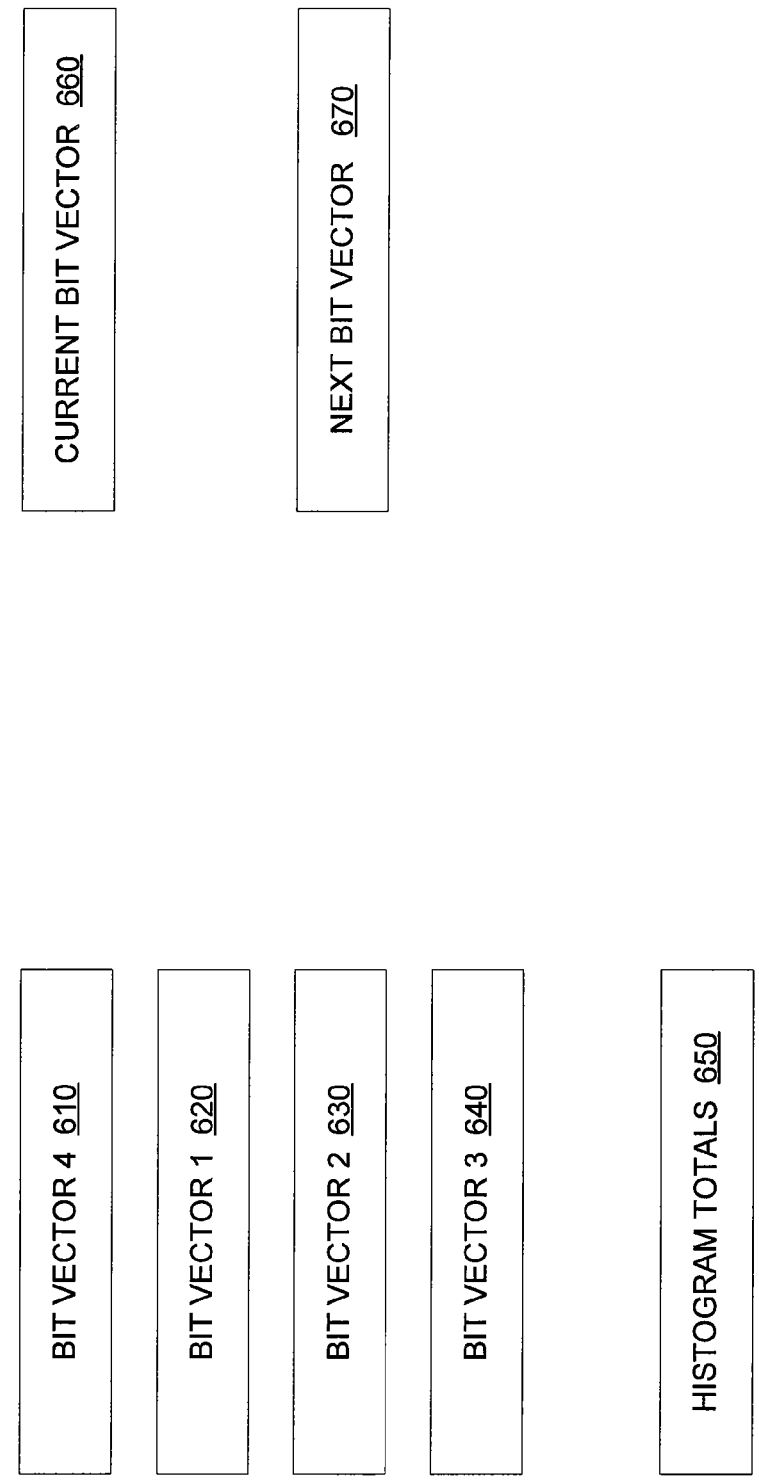
FIG. 6 illustrates a histogram including an array of bit vectors, as well as two bit vectors that may be used in updating the histogram according to an embodiment of the present invention.

FIG. 6 illustrates a histogram including an array of bit vectors, as well as two bit vectors that may be used in updating the histogram according to an embodiment of the present invention. This figure includes a histogram including the bit vectors vector 1 620, vector 2 630, vector 3 640, and vector 4 610, which are used to generate histogram totals 650, as well as current bit vectors 660 and next bit vector 670.

The previously generated characteristic data is stored in bit vectors 610, 620, 630, and 640. These bit vectors generate histogram totals 650. Data is written to the current bit vectors 660. Once the data has been written to the current bit vector 660, that data replaces the oldest bit vector of the bit vectors 610, 620, 630, and 640. At that time, data can be written to the next bit vectors 670. After the current bit vector 660 has been copied to the oldest bit vector 610, 620, 630, or 640, the current bit vector 660 may be cleared. An example is shown in the following figures.

Figure 7A:
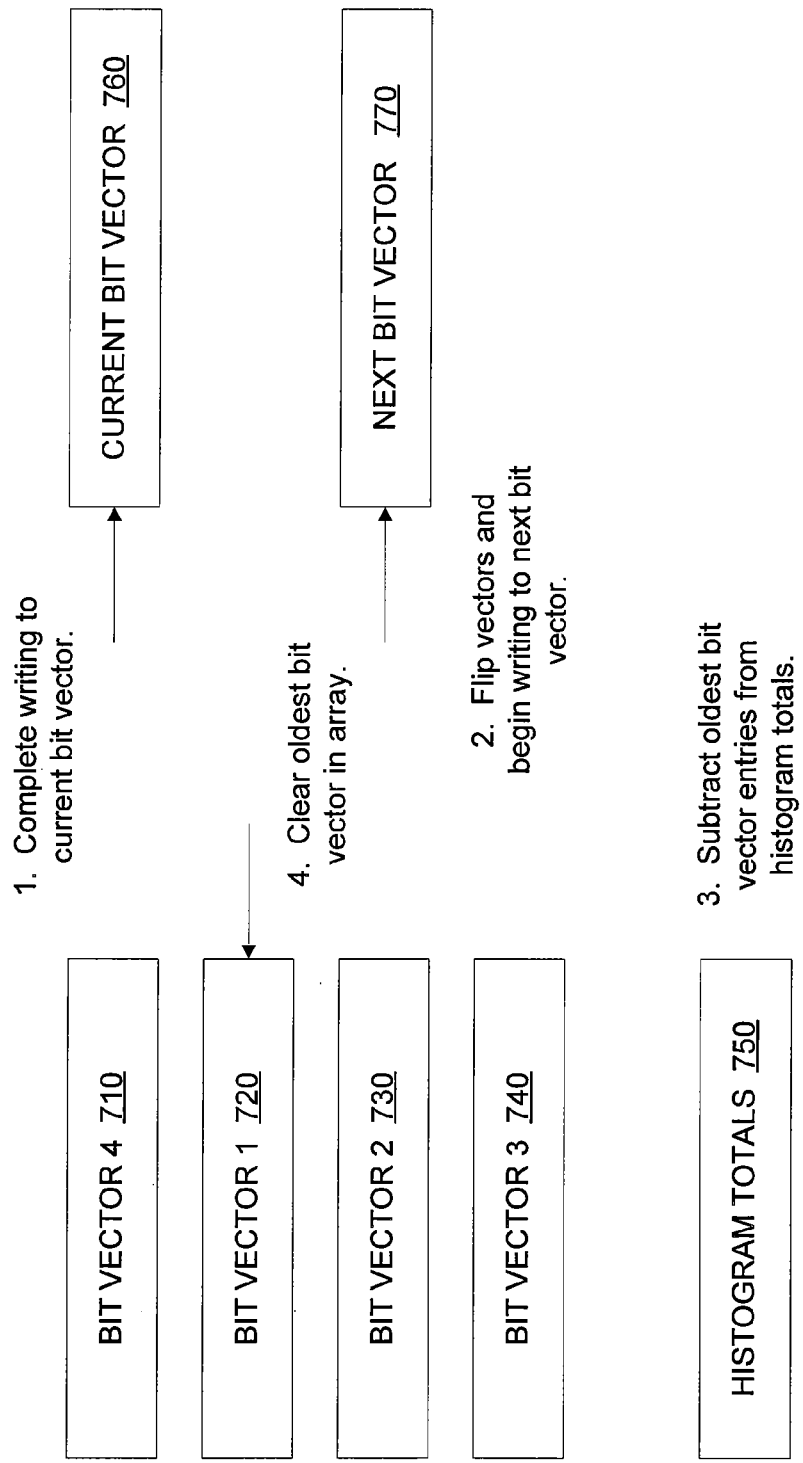
FIGS. 7A through 7C illustrate a method of updating histogram totals according to an embodiment of the present invention.
Figure 7B:
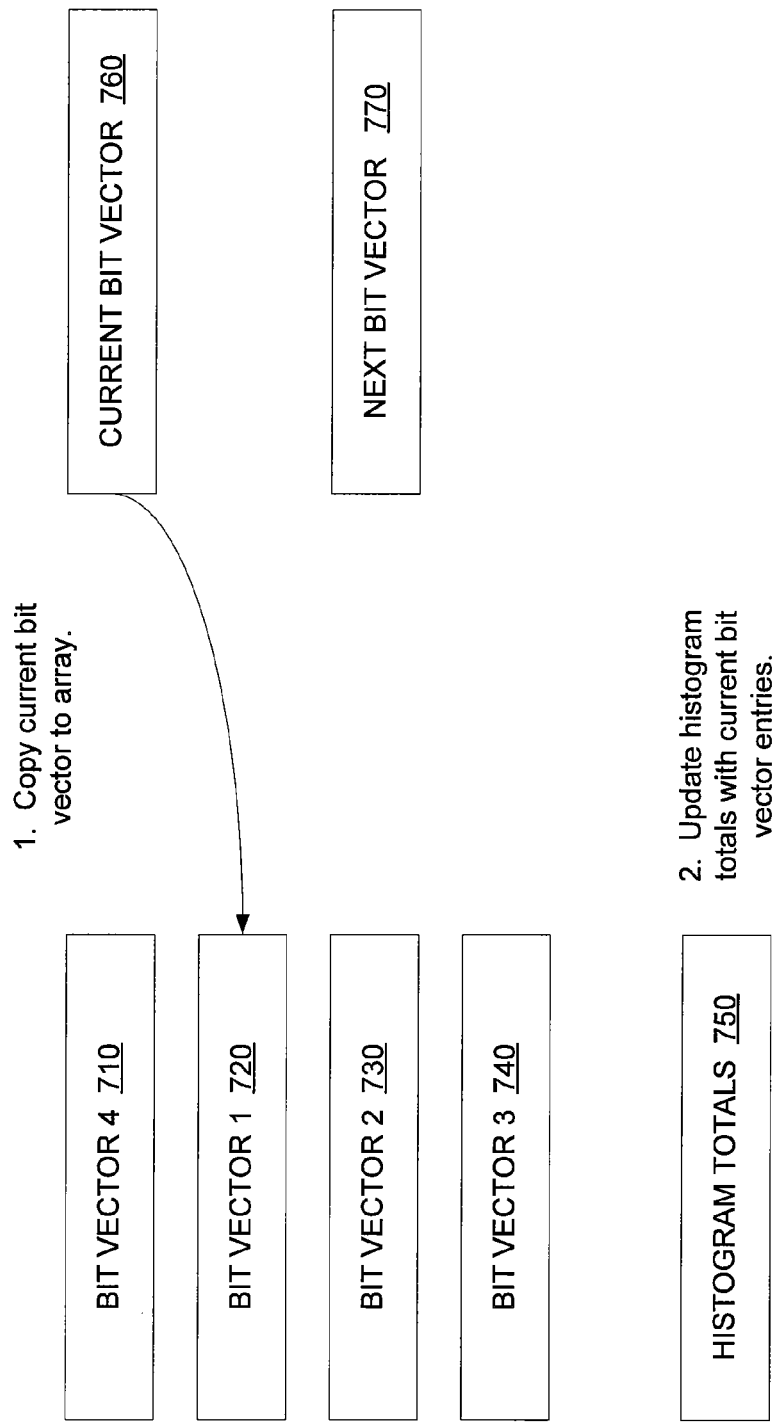
Figure 7C:
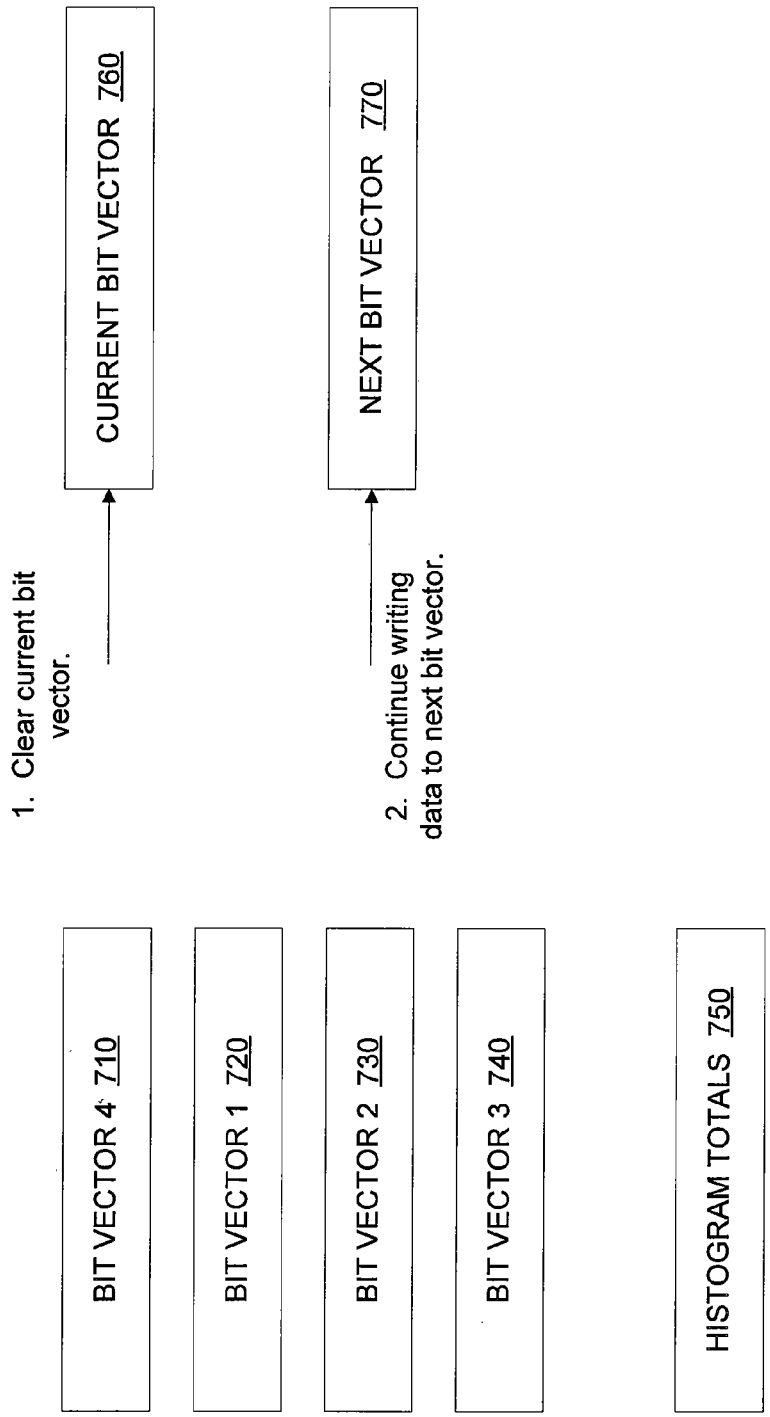

FIGS. 7A through 7C illustrate a method of updating histogram totals according to an embodiment of the present invention. These figures include histogram totals 750, which are generated by values in bits vectors vector 1 720, vector 2 730, vector 3 740, and vector 4 710. These bit vectors are updated by the current bit vectors 760 and next bit vector 770.

In FIG. 7A, writing to current bit vector 760 is completed. At this point, the bit vectors can be flipped and new data can be written to the next bit vector 770. The values of the array line or bit vector to be overwritten are subtracted from the histogram total 750, though this may be skipped if the histogram totals 750 are automatically updated with changes in the array lines or bit vectors 710-740. Once the histogram totals 750 are updated, values in bit vector 1 720 may be cleared. In FIG. 7B, the current bit vector 760 is copied to bit vector 1 720 and the histogram totals are updated with the new bit vector entry values.

In FIG. 7C, the current bit vector 760 can be cleared, such that it is ready for data after data has been written to the next vector 770. In this way, data is always being written to one of these two bit vectors, that is, either the current bit vector 760 or next bit vector 770.

Using a current and a next bit vector allows data to always be written to one vector or the other. After data is written to one, the buffers flip and data is written to the second. Data from the first can then be used to update a histogram value, before being cleared.

In various embodiments of the present invention, these various functions may be done by either software or hardware. In a specific embodiment of the present invention, hardware is used to accelerate the copying and clearing of these bit vectors. A flowchart illustrating the operation of such an embodiment is shown in the following figure.

Figure 8:
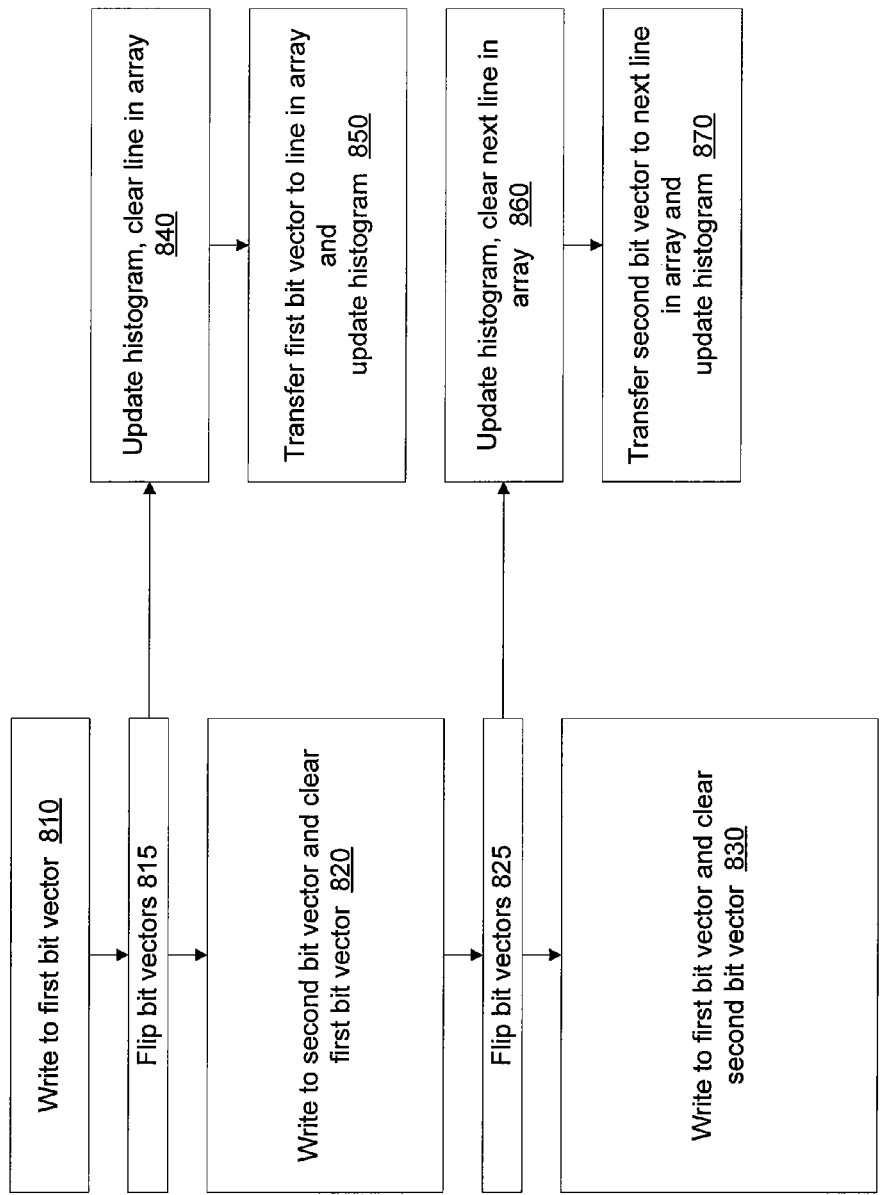
FIG. 8 is a flowchart illustrating a method of updating histogram values according to an embodiment of the present invention.

FIG. 8 is a flowchart illustrating a method of updating histogram values according to an embodiment of the present invention. Activities on the left side of this figure illustrate how either a first or second bit vector is always available to receive data, and how these vectors are flipped and cleared after data writing is complete. Activities on the right side of this figure illustrate activities performed by a histogram array using one of the bit vectors, while data is being written to the other bit vector.

Specifically, in act 810, data is written to a first bit vector. In act 815, the bit vectors are flipped. Data is written to a second bit vector in act 820. In act 840, histogram totals are updated by subtracting entries in the bit vector array line that is to be overwritten. Once the totals are updated, the array line can be cleared in act 840. In act 850, the first bit vector, now complete, is transferred or copied to the bit vector array line and the histogram is updated accordingly. Also in act 820, the first bit vector, having been copied, is cleared.

In act 825, the data writing to the second bit vector is completed, and the bit vectors are flipped once again. Following this, data is written to the first bit vector in act 830. In act 860, histogram totals are updated by subtracting entries in the bit vector array for the next array line to be overwritten. Once the histogram totals are updated, the next array line can be cleared, also in act 860. In act 870, the second bit vector, now complete, is transferred to the next line in the bit vector array and the histogram totals are updated accordingly. Also in act 830, the second bit vector, now copied, can be cleared.

In the above embodiments, two bit vectors are used to provide data for a histogram. In various embodiments of the present invention that do not require a histogram, two bit vectors may be written to in the same alternating manner. The bit vector that is not being written to may either be read from or otherwise used, or copied to another location to be read or otherwise used.

In various embodiments of the present invention, data is written to one vector for a certain duration. The length of this duration or period may be determined by one or more factors. For example, the length may be determined by a certain number of clock cycles. Alternately, the length may be determined by a specific number of instructions or activities. In other embodiments, certain events may trigger the end of the duration. For example, a page flip or other event may trigger the end of data being written to a vector and initiate a vector flip.

Embodiments of the present invention described above provide an efficient way to track characteristics of pages residing in a physical memory. For example, page usage data can be efficiently tracked using the bit vectors described above. Further embodiments of the present invention utilize this data when determining which pages in physical memory to overwrite with data that would be needed to render a possibly upcoming scene, as described below.

On occasion, the scene or view being rendered by a graphics processing unit may suddenly change. For example, in a game, an avatar may turn a corner or a walk-through a doorway, whereupon the view changes dramatically. When this occurs, a great deal of new texture and vertex data is needed by the graphics processor. If this data is not resident in physical memory, a number of page faults occur, and the needed data must be paged in from the drive. Similar events may occur in other types of applications as well.

Unfortunately, this process can take a relatively long time to accomplish. This is particularly true if a large number of page faults occur. It is expected that in some games or other applications over a hundred page faults may occur in such a situation. When this happens, frame-rate performance deteriorates and the game action or application may hesitate or stutter.

Accordingly, further embodiments of the present invention read in some of these pages from the disk in an anticipatory manner. In this way, when the avatar turns the corner or walks through the doorway, some or all of the necessary data has been paged in from the drive and is resident in physical memory. This process can be distributed over several frames, such that smaller amounts of data are paged in each frame. This avoids having a large amount of data demand paged at one time. Again, the page usage data that is tracked as described above can be used to determine which pages and memory are overwritten by this new data.

On occasion, some of this newly paged-in data will not be used. That is, the avatar may not turn the corner or walk through the doorway as anticipated. Also, some of this data may overwrite data that is needed later and has to be paged-in from the disk again. These factors likely mean that when these embodiments of the present invention are employed, the total number of pages swapped in from the disk increases. However, since these swaps are spread over many frames, they tend to not stall the game or other application. Situations where a large number of page faults occur in one frame are avoided.

In one embodiment of the present invention, one or more possible upcoming views are determined. This information may be provided by the game or application itself, it may be provided by a device driver, or it may be provided in other ways. To save processing capacity, these views are typically not actually rendered, rather the addresses of textures, vertices, and other data that is needed to render the scene are tracked. This tracking may be done using a bit vector. Unlike the bit vectors described above, which only track pages resident in memory, these bit vectors track pages on the disk. Accordingly, whereas the above current usage bit vector uses physical addresses, the upcoming usage bit vector uses virtual addresses. These bit vectors may also track pages resident in memory, as will be described below. Once it is known what pages may need to be paged in from memory, the page usage bit vectors that track the usage of pages in physical memory can be consulted to determine which pages should be overwritten. These pages can then be overwritten with the new pages swapped in from the disk. A flowchart illustrating this is shown in the following figure.

Figure 9:
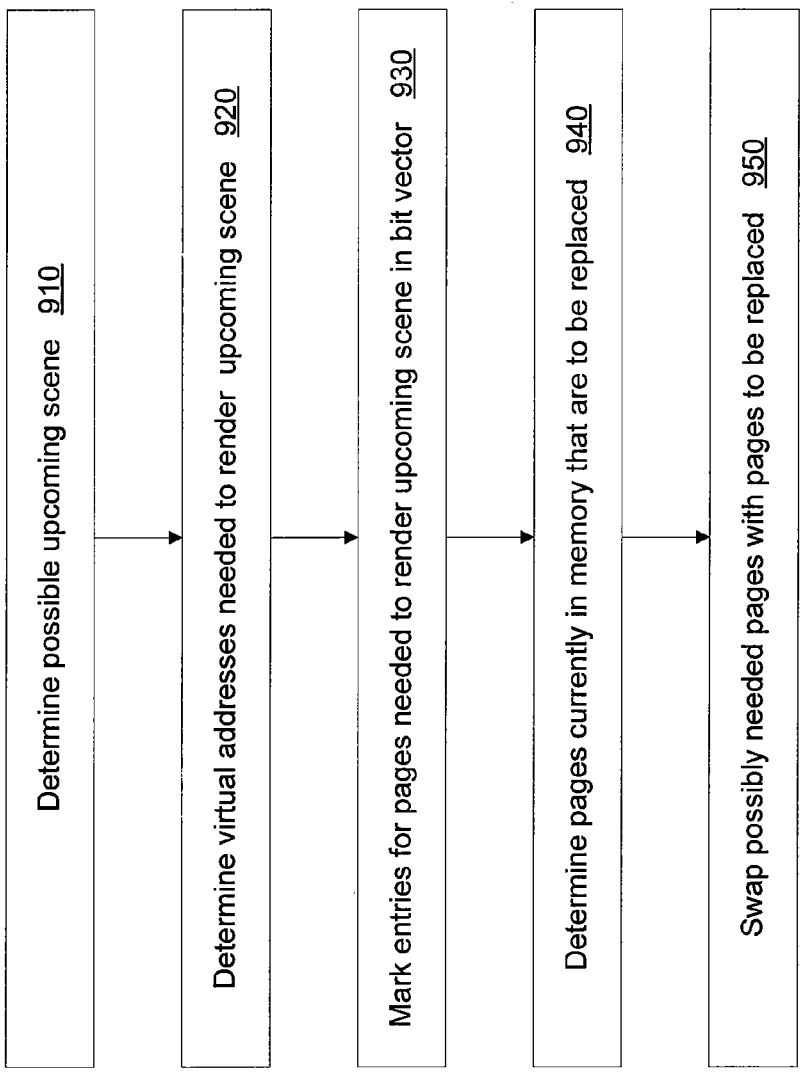
FIG. 9 is a flowchart illustrating a method of pre-loading pages that may be needed to render an upcoming scene.

FIG. 9 is a flowchart illustrating a method of pre-loading data that may be needed to render an upcoming scene. In this method, one or more possible upcoming scenes are determined. Virtual addresses of data needed to render the upcoming view or views are determined. Page usage data is then examined to see which pages in physical memory should be overwritten. The pages that will be needed if the upcoming view or views are rendered are read in from disk and replace the pages to be overwritten.

Specifically, in act 910, one or more possible upcoming views are determined. Again, this information may be provided by the application itself, it may be provided by device drivers, or it may be provided or determined from another source. In act 920, the virtual addresses of data that will be needed to render the upcoming view or views are determined. This may be done by actually rendering the possible upcoming view or views. However, since this is wasteful of resources, typically the view is not fully rendered. As these virtual addresses are found, entries in a bit vector are marked to identify pages that will be needed.

During this time, the graphics processor continues to render current scenes for display on a monitor. Data needed for the scenes is tracked by the usage bit vectors as described above. With this data, in act 940, the pages to be replaced are determined. Data that may be needed for these upcoming scenes can be paged-in from the disk and stored in pages identified by the usage bit vectors, and to the extent possible in unused memory locations, in act 950.

These embodiments of the present invention thus employ two different bit vectors or groups of bit vectors. The first bit vector is the current usage bit vector. This vector tracks the actual usage of pages that are resident in physical memory. Physical addresses that correspond to memory locations are used. This bit vector may additionally track potential usage in one or more upcoming scenes, as described below. This bit vector may actually include multiple bit vectors.

The second bit vector is the upcoming usage bit vector, which tracks page usage for possible upcoming scenes and uses virtual addresses. This second vector can either track pages on the disk, or it can track pages on the disk an in the memory. For example, if pages on the disk and in the memory are tracked, this page usage data can prevent an otherwise unused or infrequently used page that may be needed for an upcoming scene from being swapped out to disk. If only pages resident on the disk are tracked, the first bit vector, the page usage bit vector, can be used to also track page usage for possible upcoming scenes, again to prevent pages needed for an upcoming scene from being swapped to disk. An example illustrating the use of these vectors is shown in the following figure.

Figure 10:
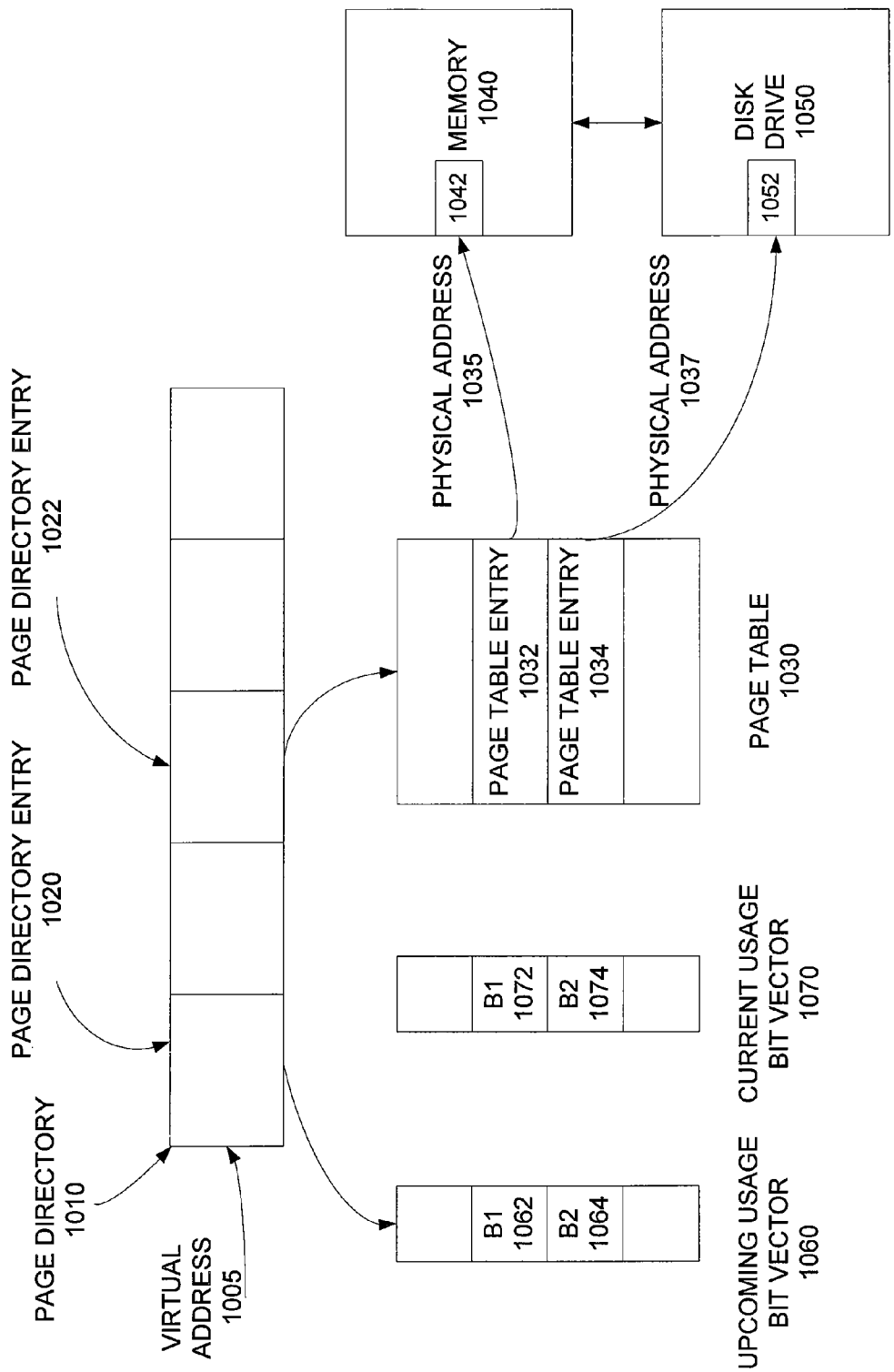
FIG. 10 illustrates data structures used for tracking potential and actual page usage data according to an embodiment of the present invention.

FIG. 10 illustrates data structures used for tracking potential and actual page usage data according to an embodiment of the present invention. This figure includes a page directory 1010 including a number of page directory entries 1020 and 1022, a page table 1030 including a number of page table entries 1032 and 1034, a physical memory 1040, disk drive 1050, upcoming page usage bit vector 1060, and current page usage bit vector 1070.

The page directory 1010 includes a number of page directory entries 1020 and 1022. Page directory entry 1020 further points to an upcoming usage bit vector 1060. This upcoming usage bit vector 1060 tracks the usage of pages that will be needed if an upcoming scene or scenes are rendered. The bit vector 1060 may be pointed to by the page directory entry 1020 using an unused bit in the page directory entry 1020. For example, an unused lower-ordered address bit may be used to indicate that the entry is pointing to a bit vector instead of a page table. The bit vector 1060 tracks pages that are not resident in memory and therefore uses virtual addresses.

The page directory entry 1022 points to a page table 1030. The page table 1030 includes page table entry 1032, which points to a page 1042 currently resident in memory, while page table entry 1034 points to a page 1052 on the disk drive 1050. As scenes are rendered, the current usage bit vector 1070 tracks usage data of the various pages resident in memory 1040. The bit vector 1070 tracks actual usage of pages resident in memory and therefore uses physical addresses. The flow of data among these structures is shown in the following figure.

Figure 11A:
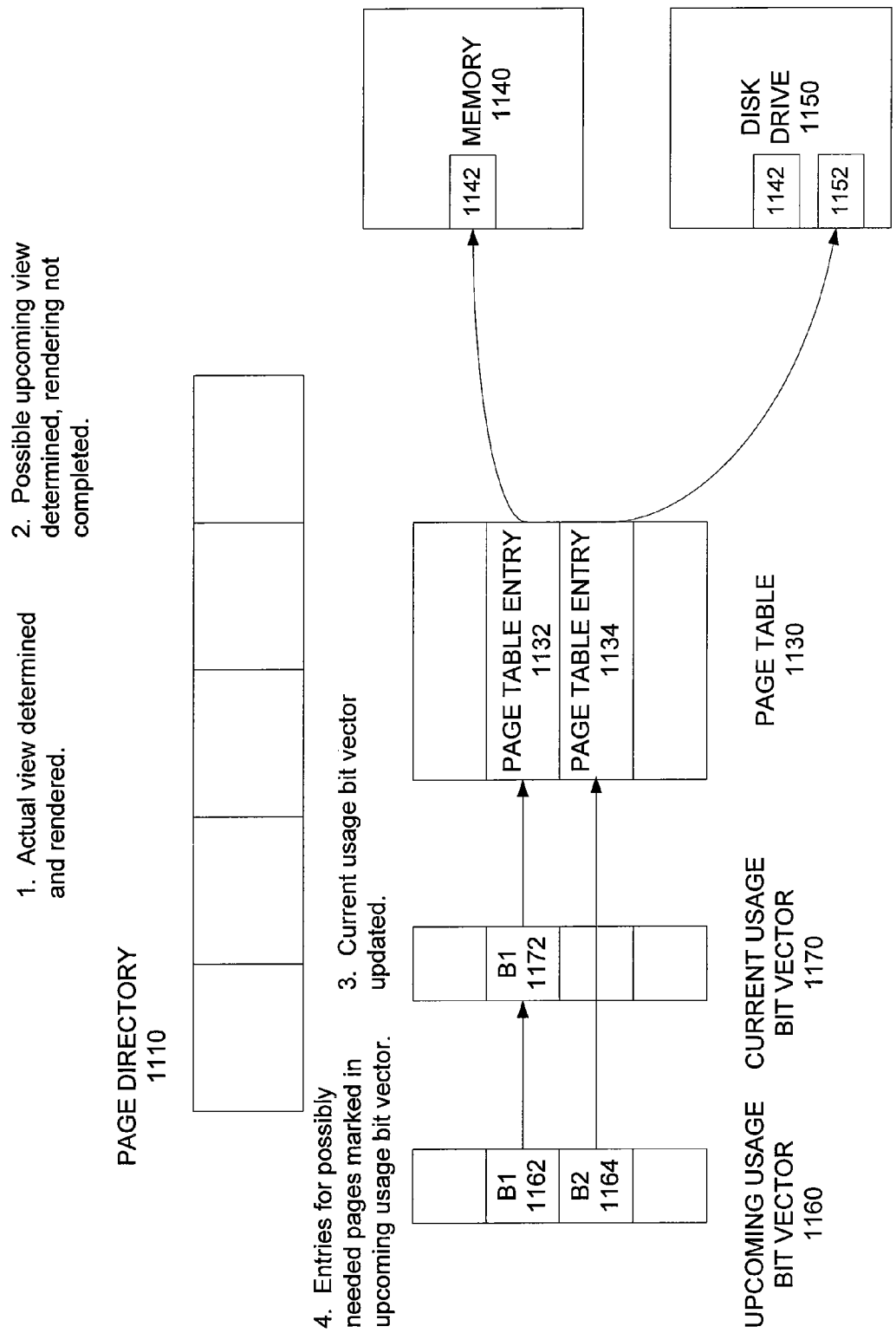
FIGS. 11A-B illustrate the flow of data among the data structures of FIG. 10 according to an embodiment of the present invention.
Figure 11B:
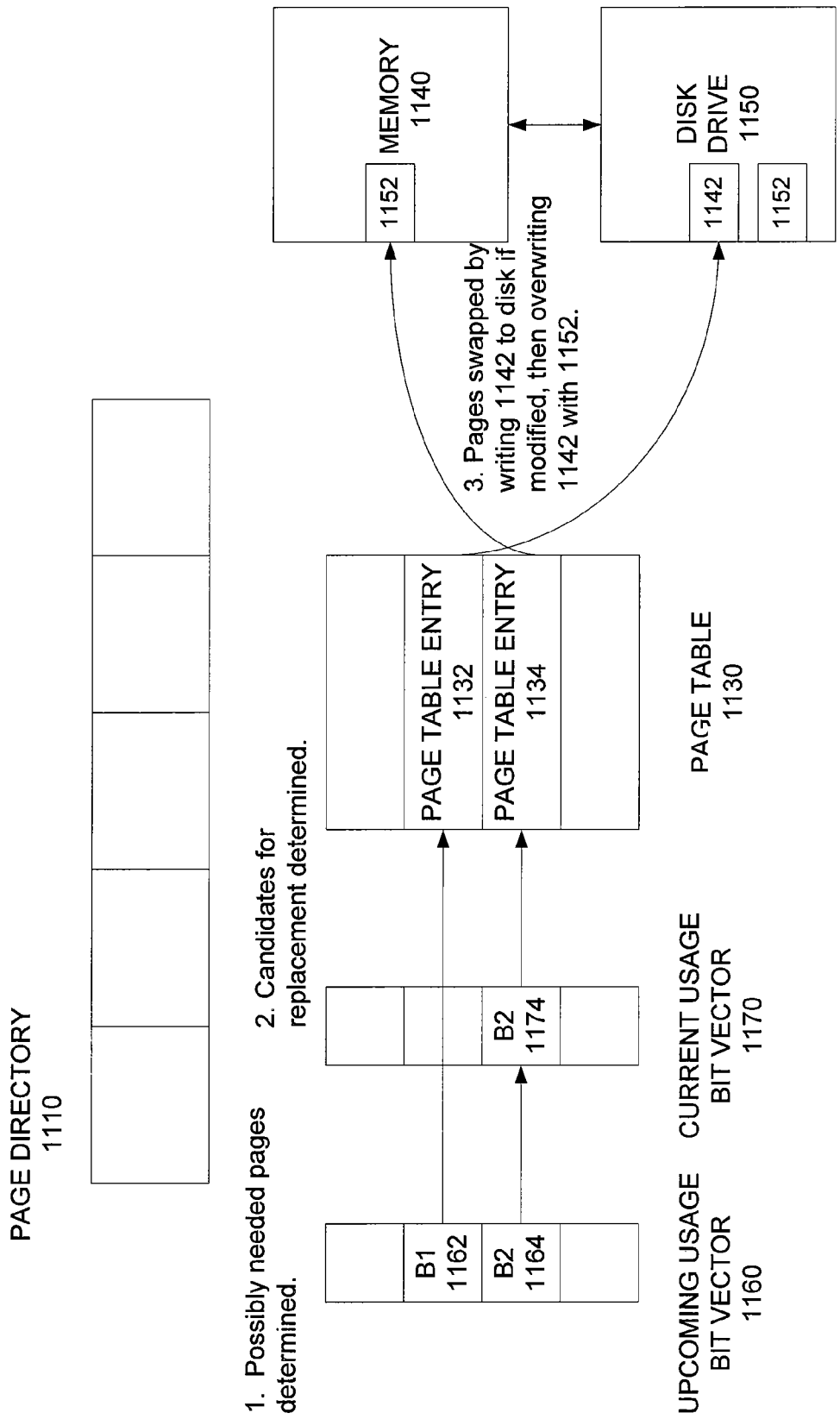

FIGS. 11A-B illustrate the flow of data among the data structures of FIG. 10 according to an embodiment of the present invention. In FIG. 11A, a bit 1172 in the current usage bit vector 1170 tracks the actual usage of the page 1142 in memory 1140, which is identified by page table entry 1132 in page table 1130. A bit 1164 in upcoming usage bit vector 1160 tracks the potential use of page 1152, which is on the disk drive 1150 and is identified by page table entry 1134 in page table 1130. Bit 1162 in upcoming usage bit vector 1160 similarly tracks the possible upcoming usage of page 1142.

In this example, an actual view is rendered and current usage bit vector 1170 is updated accordingly. Also, one or more possible upcoming views are determined. While the rendering is not fully completed, the pages that would be necessary to render this in view are marked in the upcoming usage bit vector 1160.

In FIG. 11B, pages that will be needed to be copied from the disk 1150 if the upcoming view is actually rendered are determined using the upcoming usage bit vector 1160. Candidate pages for replacement can be determined or identified by consulting the current usage bit vector. Also, it is desirable to prevent a situation where a page that is not currently being used, but may be needed, is swapped out to the disk. This can be avoided by further consulting the upcoming usage bit vector 1160 before removing pages.

Pages to be replaced that have been modified are written back to the disk. Some or all of the pages identified by the upcoming usage bit vector can be swapped in for the pages to be replaced. Also, any unoccupied space in a memory 1140 can be filled by these pages coming in from the disk drive 1150.

In other embodiments of the present invention, the upcoming usage bit vector 1160 may track only pages that are only on the disk, instead of tracking pages both on the disk and in the memory, as in the above examples. In this case, upcoming usage data can be written to the current bit vector 1170. So long as one vector tracks possible upcoming usage, pages that are currently not used, but will be used if the upcoming scene is rendered, are less likely to be swapped out to disk in favor of other pages.

In these examples, one bit vector is shown for both the upcoming usage bit vector 1060 and the current usage bit vector 1070. In various embodiments of the present invention, one or more of these vectors may be multiple vectors. For example, they may each be two vectors where data is read from one while data is written to the other. They may also be a collection of vectors where vector values are accumulated to form a histogram.

Often, various objects included in a scene are not actually visible. Accordingly, memory bandwidth is wasted unnecessarily when the data is swapped in from the disk, only to not be used since it is not visible. Accordingly, various embodiments of the present invention determined visibility before swapping in pages for a possible upcoming scene. That is, while these possible upcoming scenes are still not rendered, enough of the rendering process is completed to determine which data objects are occluded. In this way, the corresponding pages to not have to be read in from memory. A flowchart illustrating this is shown in the following figure.

Figure 12:
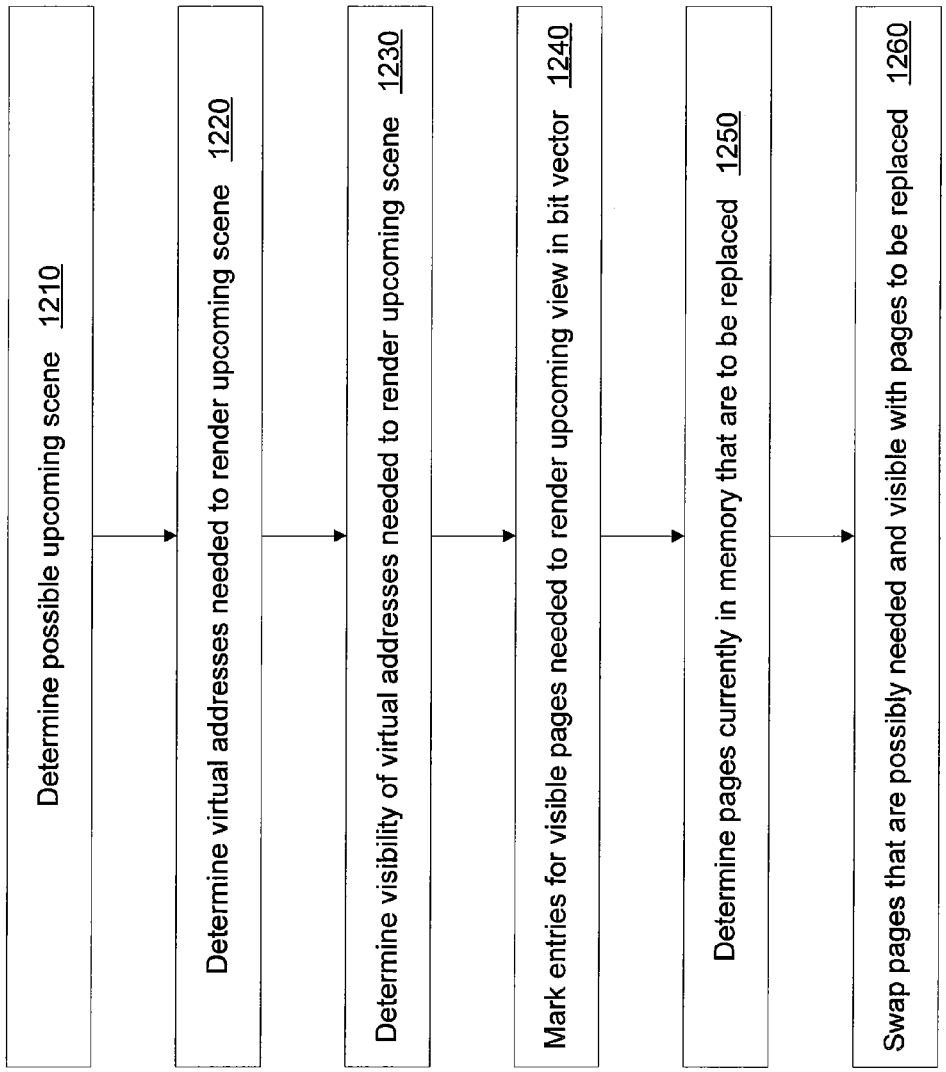
FIG. 12 is a flowchart illustrating a method of pre-loading pages that may be needed to render an upcoming scene.

FIG. 12 is a flowchart illustrating a method of pre-loading pages that may be needed to render an upcoming scene. In this method, one or more possible upcoming scenes are determined. Virtual addresses of data needed to render the upcoming view or views are determined. Visibility of this data is also determined. Page usage data is then examined to see which pages in physical memory should be overwritten. The pages that will be visible if the upcoming view or views are rendered are read in from disk. These pages then replace the pages to be overwritten.

Specifically, in act 1210, one or more possible upcoming views are determined. In act 1220, the virtual addresses of data that will be needed to render the upcoming view or views are determined. The visibility of this data is determined in act 1230. This can be done, for example, by performing enough rendering steps to generate a z-buffer (or depth buffer). As the addresses for data that will be needed and visible are found, entries in a bit vector are marked to identify their pages in act 1240.

During this time, the graphics processor continues to render current scenes. Data needed for the scenes is tracked by the usage bit vectors as described above. With this data, in act 1250, the pages to be replaced are determined. Data that will be needed and visible if upcoming, scenes are rendered can be paged from the disk and stored in pages identified by the usage bit vectors, and to the extent possible in unused memory locations, in act 1260.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of preloading graphics data comprising:
receiving information for a possible upcoming graphical scene;
determining virtual addresses for data needed to render the possible upcoming graphical scene;
determining a plurality of pages of data needed to render the possible upcoming graphical scene;
determining a plurality of pages stored in a memory to be replaced; and
replacing the plurality of pages stored in the memory to be replaced with the plurality of pages of data needed to render the possible upcoming graphical scene,
wherein determining a plurality of pages stored in a memory to be replaced comprises tracking usage of pages stored in memory while a current scene is being rendered.

2. The method of claim 1 wherein the information for the possible upcoming scene is provided by an application.

3. The method of claim 2 wherein the application further provides information for a current scene.

4. The method of claim 3 wherein page usage in rendering the current scene is used in determining the plurality of pages stored in the memory to be replaced.

5. The method of claim 1 wherein the information regarding the possible upcoming scene is provided by a graphics processor driver.

6. The method of claim 1 wherein determining a plurality of pages stored in a memory to be replaced further comprises:
tracking usage of pages needed to render the possible upcoming graphical scene.

7. The method of claim 1 wherein the usage of pages is tracked using physical addresses corresponding to memory locations.

8. The method of claim 1 wherein replacing the plurality of pages stored in the memory to be replaced with the plurality of pages of data needed to render the possible upcoming graphical scene comprises:
for each page to be replaced, determining whether the page was modified since while stored in the memory, and if it was, writing the page back to a hard drive, else
overwriting the page to be replaced by a page of data needed to render the possible upcoming graphical scene.

9. A computer system comprising:
a central processing unit to provide information for a possible upcoming scene;
a graphics processor to receive the information for the possible upcoming scene, to determine virtual addresses of data needed to render the possible upcoming scene, and to render a current scene; and
a memory to store a first bit vector indicating the virtual addresses of data needed to render the possible upcoming scene, and to store a second bit vector indicating the usage of data stored in the memory by the graphics processing unit in rendering the current scene, wherein the usage of data stored in the memory by the graphics processing unit in rendering the current scene is tracked using physical addresses.

10. The computer system of claim 9 further comprising:
a hard disk to provide data to the memory.

11. The computer system of claim 9 wherein the memory is a local memory.

12. The computer system of claim 9 wherein the memory is a system memory.

13. A method of preloading graphics data comprising:
receiving information regarding a possible upcoming graphical scene;
determining visibility of data needed to render the possible upcoming graphical scene;
determining virtual addresses of visible data needed to render the possible upcoming graphical scene;
determining a plurality of pages of visible data needed to render the possible upcoming graphical scene;
determining a plurality of pages stored in a memory to be replaced; and
replacing the plurality of pages stored in the memory to be replaced with the plurality of pages of visible data needed to render the possible upcoming graphical scene.

14. The method of claim 13 wherein the information for the possible upcoming scene is provided by an application.

15. The method of claim 14 wherein the application further provides information for a current scene.

16. The method of claim 15 wherein page usage in rendering the current scene is used in determining the plurality of pages stored in the memory to be replaced.

17. The method of claim 13 wherein the information regarding the possible upcoming scene is provided by a graphics processor driver.

18. The method of claim 13 wherein determining a plurality of pages stored in a memory to be replaced comprises:
tracking usage of pages stored in memory while a current scene is being rendered.

19. The method of claim 18 wherein the usage of pages is tracked using physical addresses corresponding to memory locations.

20. The method of claim 13 wherein replacing the plurality of pages stored in the memory to be replaced with the plurality of pages of data needed to render the possible upcoming graphical scene comprises:
for each page to be replaced, determining whether the page was modified since while stored in the memory, and if it was, writing the page back to a hard drive, else
overwriting the page to be replaced by a page of data needed to render the possible upcoming graphical scene.

* * * * *